US006758991B2

(12) United States Patent
DiMilia et al.

(10) Patent No.: US 6,758,991 B2
(45) Date of Patent: Jul. 6, 2004

(54) STABLE INERT ANODES INCLUDING A SINGLE-PHASE OXIDE OF NICKEL AND IRON

(75) Inventors: Robert A. DiMilia, Greensburg, PA (US); Joseph M. Dynys, New Kensington, PA (US); Douglas A. Weirauch, Jr., Murrysville, PA (US); Siba P. Ray, Murrysville, PA (US); Xinghua Liu, Murrysville, PA (US); Frankie E. Phelps, Apollo, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/291,122

(22) Filed: Nov. 8, 2002

(65) Prior Publication Data

US 2004/0089852 A1 May 13, 2004

(51) Int. Cl.[7] .......................... H01B 1/02; B01D 59/40; C25C 3/06; C01G 1/00; B22F 9/00

(52) U.S. Cl. .................... 252/519.1; 252/513; 252/514; 252/518.1; 252/521.2; 204/243.1; 205/372; 205/380; 205/385; 75/46; 445/46; 501/71; 501/112; 501/126; 423/138; 423/594

(58) Field of Search ........................... 252/519.1, 521.2, 252/518.1, 519.15, 514, 513; 204/243.1, 290.12, 290.14; 205/385, 372, 380; 75/246; 501/112, 126, 71; 423/138, 594, 15, 30, 35; 445/46

(56) References Cited

U.S. PATENT DOCUMENTS 3,996,117 A 12/1976 Graham et al.
4,039,401 A 8/1977 Yamada et al.
4,190,516 A 2/1980 Kajimaya et al.
4,288,302 A 9/1981 de Nora et al.
4,290,859 A 9/1981 Oda et al.
4,320,321 A 3/1982 Alexandrov et al.
4,374,050 A 2/1983 Ray
4,374,761 A 2/1983 Ray
4,397,729 A 8/1983 Duruz et al.
4,399,008 A 8/1983 Ray
4,455,211 A 6/1984 Ray et al.
4,472,258 A 9/1984 Secrist et al.
4,478,693 A * 10/1984 Ray ........................... 205/387

(List continued on next page.)

FOREIGN PATENT DOCUMENTS

EP 030834 * 6/1981 ............. C25C/3/12
WO WO 02/066710 A1 8/2002

OTHER PUBLICATIONS

U.S. patent application Ser. No. 10/291,874, Weirauch Jr., et al., filed Nov. 8, 2002.

Belyaev, A.I., "Electrolysis of Aluminum with Nonburning Ferrite Anodes", *Legkie Metal.*, 7(1): 7–20, 1938. No month available.

Billehaug, Kari, et al., "Inert Anodes for Aluminum Electrolysis in Hall–Héroult Cells (I)", *Aluminum*, pp. 146–150, 1981. No month available.

Billehuag, Kari, et al., "Inert Anodes for Aluminum Electrolysis in Hall–Héroult Cells (II)", *Aluminum*, pp. 228–231, 1981, No month available.

*Primary Examiner*—Yogendra N. Gupta
*Assistant Examiner*—Kallambella Vijayakumar
(74) *Attorney, Agent, or Firm*—Alan G. Towner; Tracey D. Beiriger

(57) ABSTRACT

Ceramic inert anodes useful for the electrolytic production of aluminum are disclosed. The inert anodes comprise an oxide of Ni and Fe having a controlled Ni/(Ni+Fe) mole ratio which results in a single-phase structure at the operation temperatures of aluminum production cells. The Ni and Fe oxide material may also have a single-phase structure at the sintering temperature of the material. The single-phase inert anode materials maintain sufficient electrical conductivity at the operating temperatures of the cell, and also possess good mechanical stability.

28 Claims, 18 Drawing Sheets

U.S. PATENT DOCUMENTS

| | | | |
|---|---|---|---|
| 4,552,630 | A | 11/1985 | Wheeler et al. |
| 4,582,585 | A | 4/1986 | Ray |
| 4,584,172 | A | 4/1986 | Ray et al. |
| 4,620,905 | A | 11/1986 | Tarcy et al. |
| 4,871,437 | A | 10/1989 | Marschman et al. |
| 4,871,438 | A | 10/1989 | Marschman et al. |
| 4,960,494 | A | 10/1990 | Nguyen et al. |
| 5,019,225 | A | 5/1991 | Darracq et al. |
| 5,137,867 | A | 8/1992 | Ray et al. |
| 5,254,232 | A | 10/1993 | Sadoway |
| 5,279,715 | A | 1/1994 | La Camera et al. |
| 5,284,562 | A | 2/1994 | Beck et al. |
| 5,378,325 | A | 1/1995 | Dastolfo, Jr. et al. |
| 5,626,914 | A | 5/1997 | Ritland et al. |
| 5,794,112 | A | 8/1998 | Ray et al. |
| 5,865,980 | A | 2/1999 | Ray et al. |
| 5,938,914 | A | 8/1999 | Dawless et al. |
| 6,126,799 | A | 10/2000 | Ray et al. |
| 6,187,168 | B1 | 2/2001 | LaCamera et al. |
| 6,217,739 | B1 | 4/2001 | Ray et al. |
| 6,372,119 | B1 | 4/2002 | Ray et al. |
| 6,416,649 | B1 | 7/2002 | Ray et al. |
| 6,423,195 | B1 | 7/2002 | Ray et al. |
| 6,423,204 | B1 | 7/2002 | Ray et al. |
| 2002/0153627 | A1 | 10/2002 | Ray et al. |

* cited by examiner

STABLE INERT ANODES INCLUDING A SINGLE-PHASE OXIDE OF NICKEL AND IRON

FIELD OF THE INVENTION

The present invention relates to inert anodes useful for the electrolytic production of aluminum, and more particularly relates to stable inert anodes comprising a single-phase oxide of nickel and iron.

BACKGROUND OF THE INVENTION

The energy and cost efficiency of aluminum smelting can be significantly reduced with the use of inert, non-consumable and dimensionally stable anodes. Replacement of traditional carbon anodes with inert anodes should allow a highly productive cell design to be utilized, thereby reducing capital costs. Significant environmental benefits are also possible because inert anodes produce no $CO_2$ or $CF_4$ emissions. Some examples of inert anode compositions are provided in U.S. Pat. Nos. 4,374,050, 4,374,761, 4,399,008, 4,455,211, 4,582,585, 4,584,172, 4,620,905, 5,794,112, 5,865,980, 6,126,799, 6,217,739, 6,372,119, 6,416,649, 6,423,204 and 6,423,195, assigned to the assignee of the present application. These patents are incorporated herein by reference.

A significant challenge to the commercialization of inert anode technology is the anode material. Researchers have been searching for suitable inert anode materials since the early years of the Hall-Heroult process. The anode material must satisfy a number of very difficult conditions. For example, the material must not react with or dissolve to any significant extent in the cryolite electrolyte. It must not enter into unwanted reactions with oxygen or corrode in an oxygen-containing atmosphere. It should be thermally stable at temperatures of about 1,000° C., and should have good mechanical strength. Furthermore, the anode material must have sufficient electrical conductivity at the smelting cell operating temperatures, e.g., about 900–1,000° C., so that the voltage drop at the anode is low and stable during anode service life.

SUMMARY OF THE INVENTION

An aspect of the present invention is to provide an inert anode for use in an electrolytic aluminum production cell, the inert anode comprising a ceramic material consisting essentially of an oxide of nickel and iron which is a single phase at the operation temperature of the electrolytic aluminum production cell. The single-phase ceramic material preferably has a Ni/(Ni+Fe) mole ratio of less than 0.333, for example, from 0.290 to 0.330.

Another aspect of the present invention is to provide an electrolytic aluminum production cell comprising a molten salt bath comprising an electrolyte and aluminum oxide, a cathode, and an inert anode comprising a ceramic material consisting essentially of an oxide of nickel and iron. The ceramic material is a single phase at the operation temperature of the electrolytic aluminum production cell.

A further aspect of the present invention is to provide a method of making an inert anode. The method includes the steps of mixing nickel oxide and iron oxide in a Ni/(Ni+Fe) mole ratio of from 0.290 to 0.330, and consolidating the mixture to form a ceramic material consisting essentially of an oxide of nickel and iron having said Ni/(Ni+Fe) mole ratio, wherein the ceramic material is a single phase at an operation temperature of the electrolytic aluminum production cell.

Another aspect of the present invention is to provide a method of making commercial purity aluminum. The method includes the steps of passing current through an inert anode and a cathode through a bath comprising an electrolyte and aluminum oxide, and recovering aluminum comprising a maximum of 0.2 weight percent Fe and a maximum of 0.034 weight percent Ni. The inert anode comprises a ceramic material consisting essentially of an oxide of nickel and iron which is a single phase at an operation temperature of the electrolytic aluminum production cell.

These and other aspects of the present invention will be more apparent from the following description.

DETAILED DESCRIPTION OF PREFERRED EMBODIMENTS

Figure 1:
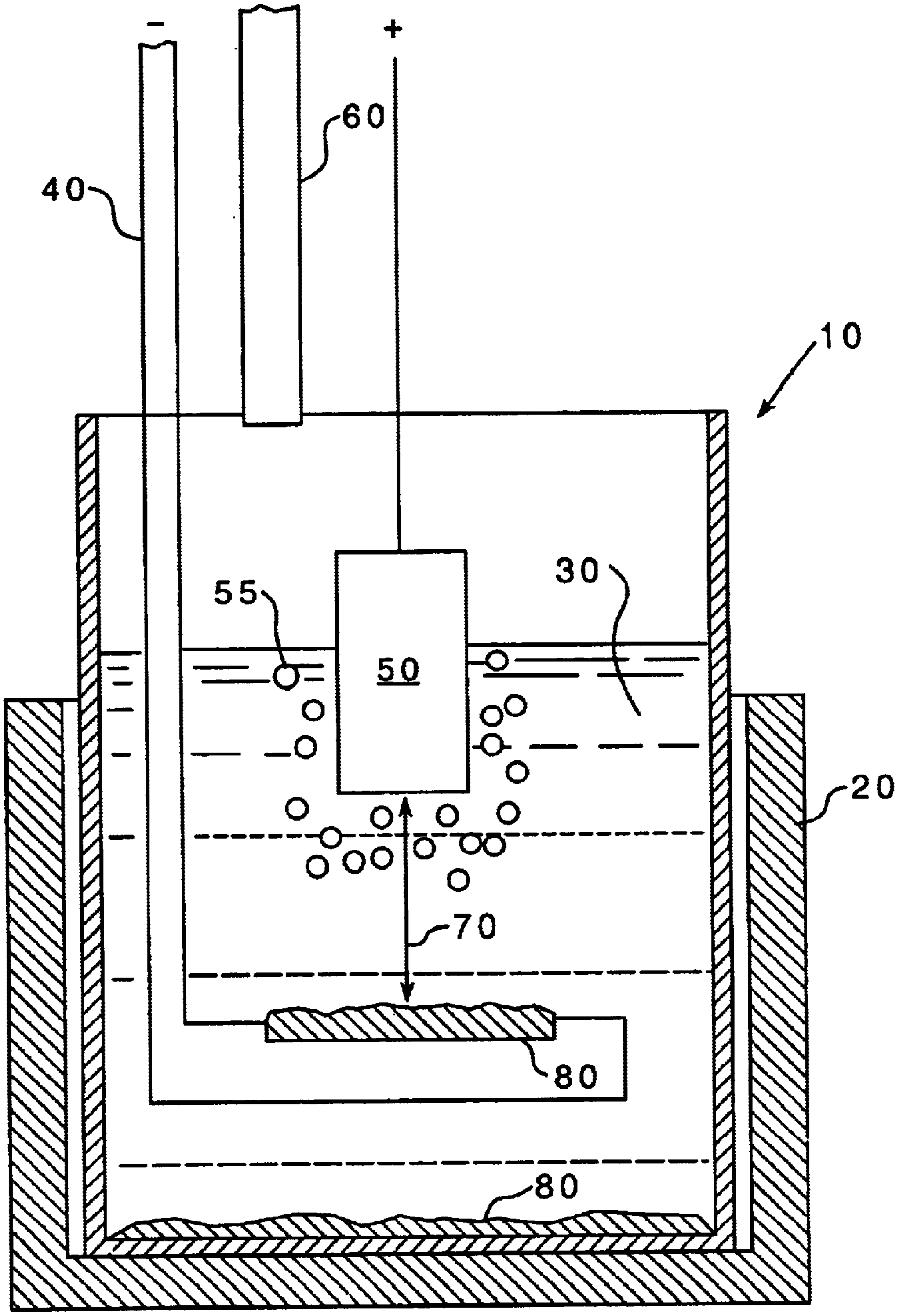
FIG. 1 is a partially schematic sectional view of an electrolytic cell including a stable, single-phase ceramic inert anode in accordance with the present invention.

FIG. 1 schematically illustrates an electrolytic cell for the production of commercial purity aluminum which includes a ceramic inert anode in accordance with an embodiment of the present invention. The cell includes an inner crucible 10 inside a protection crucible 20. A cryolite bath 30 is contained in the inner crucible 10, and a cathode 40 is provided in the bath 30. A ceramic inert anode 50 is positioned in the bath 30. An alumina feed tube 60 extends partially into the inner crucible 10 above the bath 30. The cathode 40 and ceramic inert anode 50 are separated by a distance 70 known as the anode-cathode distance (ACD). Commercial purity aluminum 80 produced during a run is deposited on the cathode 40 and on the bottom of the crucible 10. Alternatively, the cathode may be located at the bottom of the cell, and the aluminum produced by the cell forms a single pad at the bottom of the cell.

As used herein, the term "ceramic inert anode" means a substantially non-consumable, ceramic-containing anode which possesses satisfactory corrosion resistance and stability during the aluminum production process. In accordance with the present invention, the ceramic comprises a single-phase oxide of nickel and iron having a controlled Ni/(Ni+Fe) mole ratio. The single-phase ceramic may also include optional additives and/or dopants.

The term "single phase" as used herein to describe the ceramic of the inert anode means that the ceramic of at least a portion of the inert anode consists essentially of one phase, such as a spinel, at a given temperature. For example, the ceramic may be a nickel ferrite spinel which is single phase at a cell operating temperature of, e.g., about 900 to 1,000° C. The ceramic may also be single phase at a sintering temperature of the material, e.g., from about 1,200 to about 1,650° C., as well as single phase at room temperature.

As used herein, the term "commercial purity aluminum" means aluminum which meets commercial purity standards upon production by an electrolytic reduction process. The commercial purity aluminum may comprise a maximum of 0.2 weight percent Fe. For example, the commercial purity aluminum comprises a maximum of 0.15 or 0.18 weight percent Fe. In one embodiment, the commercial purity aluminum comprises a maximum of 0.13 weight percent Fe. The commercial purity aluminum may also comprise a maximum of 0.034 weight percent Ni. For example, the commercial purity aluminum may comprise a maximum of 0.03 weight percent Ni. The commercial purity aluminum may also meet the following weight percentage standards for other types of impurities: 0.1 maximum Cu, 0.2 maximum Si, 0.03 maximum Zn and 0.03 maximum Co. For example, the Cu impurity level may be kept below 0.034 or 0.030 weight percent, and the Si impurity level may be kept below 0.15 or 0.10 weight percent. It is noted that for every numerical range or limit set forth herein, all numbers with the range or limit including every fraction or decimal between its stated minimum and maximum, are considered to be designated and disclosed by this description.

The single-phase ceramic preferably comprises an oxide of iron and nickel in which the mole ratio of Ni/(Ni+Fe) is from 0.290 to 0.330. For example, the Ni/(Ni+Fe) mole ratio may be from 0.300 to 0.320, e.g., from 0.305 to 0.315. A particularly preferred Ni/(Ni+Fe) mole ratio is 0.310. It has been found in accordance with the present invention that by controlling the Ni/(Ni+Fe) mole ratio, the oxide material maintains a single-phase structure at cell operating temperatures (e.g., about 900 to 1,000° C.), as well as maintaining a single-phase structure at sintering temperatures of the material (e.g., from 1,200° C. to 1,650° C.). The single-phase structure of the material may also be maintained at room temperature.

The single-phase Ni—Fe oxide material has been found to possess sufficient electrical conductivity which remains stable during operation of the cell. In addition to stable electrical conductivity, the present single-phase Ni—Fe oxide materials provide improved mechanical properties because they do not undergo deleterious phase changes when exposed to varying temperatures during cell operation and during sintering. The formation of second phases can cause significant problems, such as cracking of the inert anodes during heat-up or cool-down of the anodes. For example, if a material comprises a single phase at either room temperature or at sintering temperature, but transforms to a two-phase material at the cell operating temperature (e.g., 900–1,000° C.), the transformation to a two-phase structure can cause cracking and failure of the anode due to differences in volumes and densities of the different phases that are formed.

Figure 2:
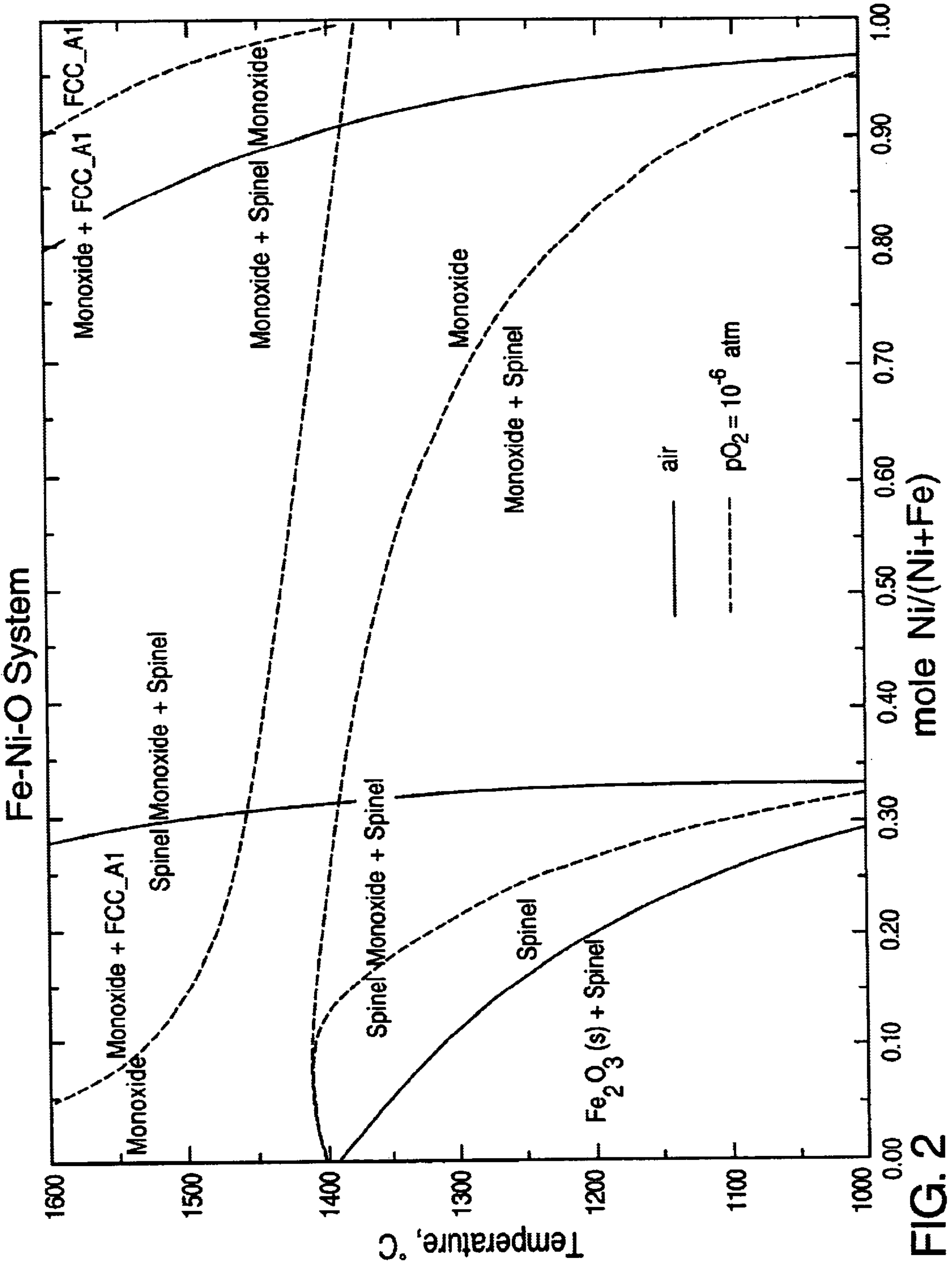
FIG. 2 is a graph of mole Ni/(Ni+Fe), illustrating the formation of various phases for different mole ratios at different temperatures.

FIG. 2 is a phase diagram of temperature versus Ni/(Ni+Fe) mole ratio, illustrating the single phase spinel region of the present nickel iron oxide material at various temperatures, including a temperature of 1,000° C. which approximates the operating temperature of a cell. As shown in FIG. 2, only a narrow band of Ni/(Ni+Fe) molar ratios of from about 0.290 to 0.330 results in a single phase material at 1,000° C. Below the 0.290 Ni/(Ni+Fe) mole ratio, both a spinel phase and a hematite phase ($Fe_2O_3$) are present at 1,000° C. In addition to problems associated with volume and density differences of the different spinel and hematite phases, the $Fe_2O_3$ phase has been found to be unstable in the molten bath of the cell. Above the 0.330 Ni/(Ni+Fe) mole ratio, both a spinel phase and a nickel-rich monoxide phase are present at 1,000° C. The volume and density differences of these phases create mechanical problems such as cracking, as well as stability problems in the molten bath of the cell due to the presence of the monoxide phase.

Figure 3:
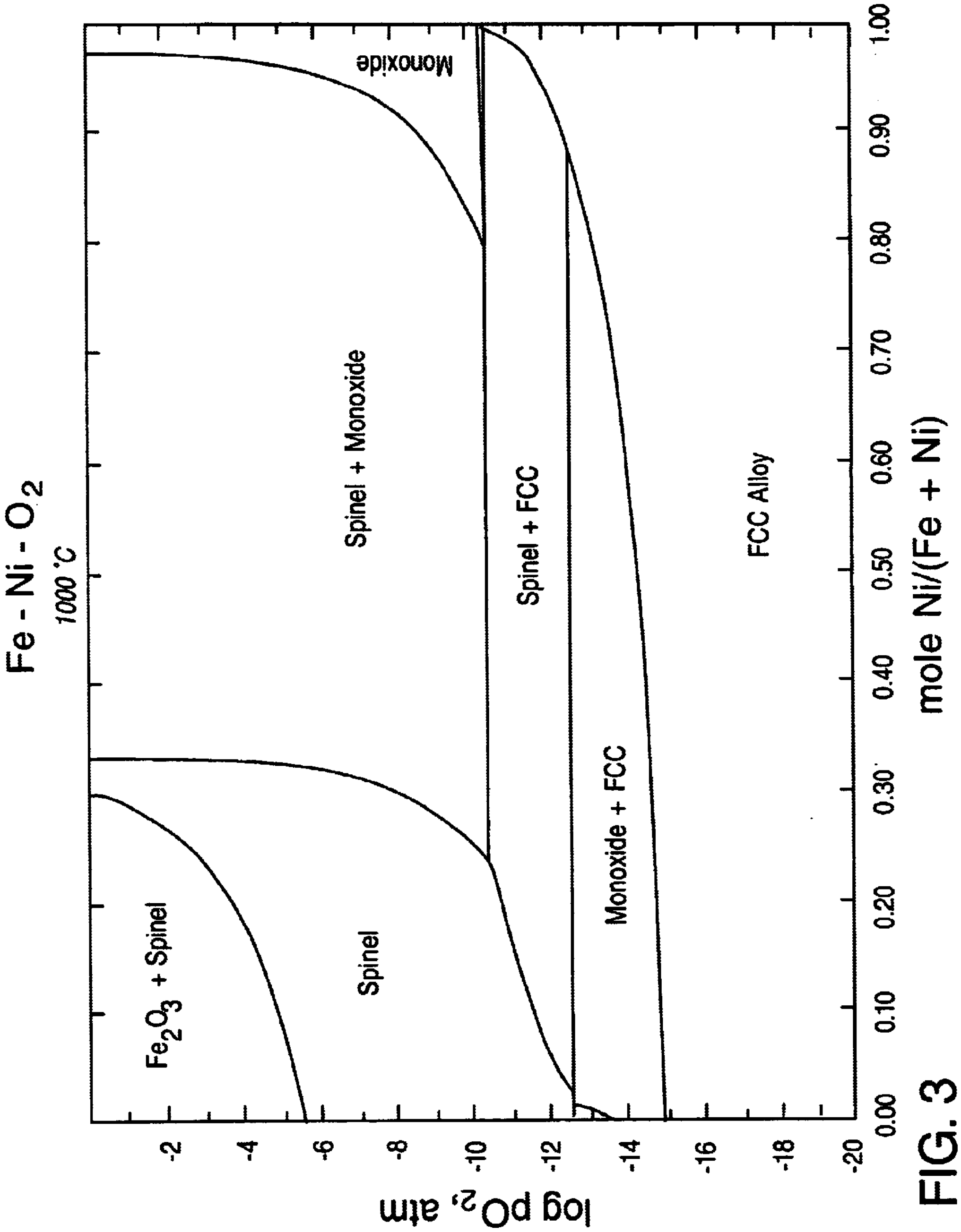
FIG. 3 is a graph of mole Ni/(Ni+Fe) versus oxygen concentration at a temperature of 1,000° C., illustrating the formation of various phases at different oxygen concentrations.

FIG. 3 is a graph of mole Ni/(Ni+Fe) versus oxygen concentration at a temperature of 1,000° C., illustrating the formation of various phases at different oxygen concentrations. The upper boundary of the graph shown in FIG. 3 corresponds to an air atmosphere. In this case, at 1,000° C. in air, only the single-phase spinel is present at a Ni/(Ni+Fe) mole ratio of from about 0.300 to 0.330.

At least a portion of the inert anode of the present invention preferably comprises at least about 90 weight percent of the single-phase ceramic, for example, at least about 95 weight percent. In a particular embodiment, at least a portion of the inert anode is made entirely of the present ceramic material. In one embodiment, the single-phase ceramic may be provided as a surface layer of the anode. Alternatively, the inert anode may comprise a monolithic body of the single-phase ceramic.

The ceramic anode material of the present invention may optionally include additives and/or dopants in amounts up to about 90 weight percent. When additives or dopants are included, they are preferably selected such that the single-phase structure of the material is substantially maintained. In one embodiment, the additive(s) may be present in relatively minor amounts, for example, from about 0.1 to about 10 weight percent. In another embodiment, the additive(s) may be present in larger amounts, for example, from about 10 to about 70 or 80 weight percent. Suitable additives include metals such as Al, Cu, Ag, Pd, Pt and the like, e.g., in amounts of from about 0.1 to about 10 weight percent of the ceramic inert anode. Suitable oxide additives or dopants include oxides of Al, Co, Cr, Ga, Ge, Hf, In, Ir, Mo, Mn, Nb, Os, Re, Rh, Ru, Se, Si, Sn, Ti, V, W, Zr, Li, Ca, Ce, Y and F, e.g., in amounts of from about 0.1 to about 50 weight percent or higher. For example, the additives and dopants may include oxides of Al, Mn, Nb, Ti, V, Zr and F.

In a preferred embodiment, the oxide additives and dopants include metal atoms M in molar amounts such that the single-phase structure is maintained. In one embodiment, the Ni/(Ni+Fe+M) mole ratio is below 0.333, e.g., a portion of the Ni may be substituted with the metal atoms M of the additive. In another embodiment, the Ni/(Ni+Fe+M) mole ratio may be greater than 0.333, e.g., a portion of the Fe may be substituted with the metal atoms M of the additive.

It is desirable to stabilize electrical conductivity in the Hall cell operating environment. This can be achieved by the addition of suitable dopants and/or additives as noted above. For example, $Al_2O_3$ may be used as an additive or dopant in an amount such that the mole ratio of Al/(Ni+Fe+Al) is less than 0.333. For example, the Al/(Ni+Fe+Al) mole ratio may be from about 0.005 to about 0.20, typically from about 0.01 to about 0.15. However, Al(Ni+Fe+Al) mole ratios above 0.333 may also be used.

The additives and dopants may be added as starting materials during production of the inert anodes. Alternatively, the additives and dopants may be introduced into the ceramic during sintering operations, or during operation of the cell. For example, the additives and dopants may be provided from the molten bath or from the atmosphere of the cell. The additives and dopants may be used, for example, to increase the electrical conductivity of the ceramic inert anode.

The inert anodes may be formed by techniques such as powder sintering, sol-gel processes, wet chemical processes, co-precipitation, slip casting and spray forming. The starting materials may be provided in the form of nickel and iron oxides. Alternatively, the starting materials may be provided in other forms, such as nitrates, halides and the like. Preferably, the inert anodes are formed by powder techniques in which powders comprising the oxides and any additives or dopants are pressed and sintered. In order to provide the desired Ni/(Ni+Fe) mole ratio (e.g., 0.290 to 0.330), starting powders of NiO and iron oxide (e.g., $Fe_2O_3$ and $Fe_3O_4$) may be used in appropriate ratios.

The NiO and iron oxide (e.g., $Fe_2O_3$ and $Fe_3O_4$) powders may be blended in a mixer. Optionally, the blended ceramic powders may be ground to a smaller size before being transferred to a furnace where they are calcined, e.g., for 0.25 to 4 hours at 1,050° C. to 1,150° C. The oxide mixture may be in a ball mill ground to an average particle size of approximately 1 micron. The fine oxide particles are blended with a polymeric binder and water to make a slurry in a spray dryer. About 0.5–5 parts by weight of an organic polymeric binder may be added to 100 parts by weight of the solid oxide particles. Some suitable binders include polyvinyl alcohol, acrylic polymers, polyglycols, polyvinyl acetate, polyisobutylene, polycarbonates, polystyrene, polyacrylates, and mixtures and copolymers thereof. Preferably, about 1–2 parts by weight of the binder are added to 100 parts by weight of the solid oxides. The slurry contains, e.g., about 60 weight percent solids and about 40 weight percent water. Spray drying the slurry produces dry agglomerates of the oxides. The spray dried oxide material may be pressed, for example, at 10,000 to 40,000 psi, into anode shapes. A pressure of about 20,000 psi is particularly suitable for many applications.

The pressed shapes may be sintered in an oxygen-containing atmosphere such as air, or in argon/oxygen, nitrogen/oxygen, $H_2/H_2O$ or $CO/CO_2$ gas mixtures, as well as nitrogen or other inert atmospheres. Sintering temperatures of from about 1,200 to about 1,650° C. for 2–4 hours may be suitable. However, lower or higher sintering temperatures may be suitable for some compositions. The sintering process burns out any polymeric binder from the anode shapes.

After sintering, the anode may be connected to a suitable electrically conductive support member within an electrolytic metal production cell by means such as welding, brazing, mechanically fastening, cementing and the like. The inert anode may include a ceramic as described above successively connected in series to a metal or cermet transition region and a nickel end. A nickel or nickel-chromium alloy rod may be welded to the nickel end. The metal transition region may include, for example, sintered metal powders and/or small spheres of copper or the like. The cermet transition region may include, for example, four layers of graded composition, ranging from 25 weight percent Ni adjacent the ceramic end and then 50, 75 and 100 weight percent Ni, balance the oxide material described above.

We prepared inert anodes of varying iron oxide and nickel oxide amounts in accordance with the procedures described above having a diameter of about ⅝ inch and a length of about 5 inches. The starting oxide powders were dry mixed, calcined, wet ground, slurried with organic binders, and spray dried to form a free-flowing powder, followed by isostatic pressing at 30,000 psi and sintering at 1,400 to 1,500° C. in an air atmosphere.

Table 1 lists ceramic inert anode compositions having varying Ni(Ni+Fe) mole ratios, along with properties of such materials. Unless otherwise indicated, each sample was sintered in air at a temperature of about 1,500° C.

TABLE 1

Ceramic Inert Anode Compositions With Varying Ni(Ni+Fe) Mole Ratios

| Sample No. | Target Mole Ratio of Ni/(Ni+Fe) | Actual Mole Ratio of Ni/(Ni+Fe) | Microstructure at 1,000° C. | Initial Electrical Conductivity at 1,000° C. (S/cm) | Salt Solubility (Wt %) Fe | Salt Solubility (Wt %) Ni | Na/F Penetration Depth (Microns) |
|---|---|---|---|---|---|---|---|
| 1 | 0.250 | 0.235 | Two phases** | 17.24 | | | |
| 2 | 0.280 | 0.258 | Two phases** | 14.84 | 0.058 | 0.003 | 320 |
| 3 | 0.290 | 0.280 | Two phases** | 13.84 | 0.059 | 0.003 | |
| 4 | 0.300 | 0.296 | Single phase | 12.12 | 0.048 | 0.004 | 80 |
| 5 | 0.310 | | Single phase | 9.12 | | | |
| 6 | 0.320 | 0.308 | Single phase | 7.41 | 0.044 | 0.005 | 40 |
| 7 | 0.330 | 0.325 | Two phases*** | 2.10 | | | |
| 8 | 0.3450 | | Two phases**** | 1.43 | 0.047 | 0.005 | 135 |
| 9* | 0.560 | 0.530 | Two phases**** | | | | |

Figure 4A:
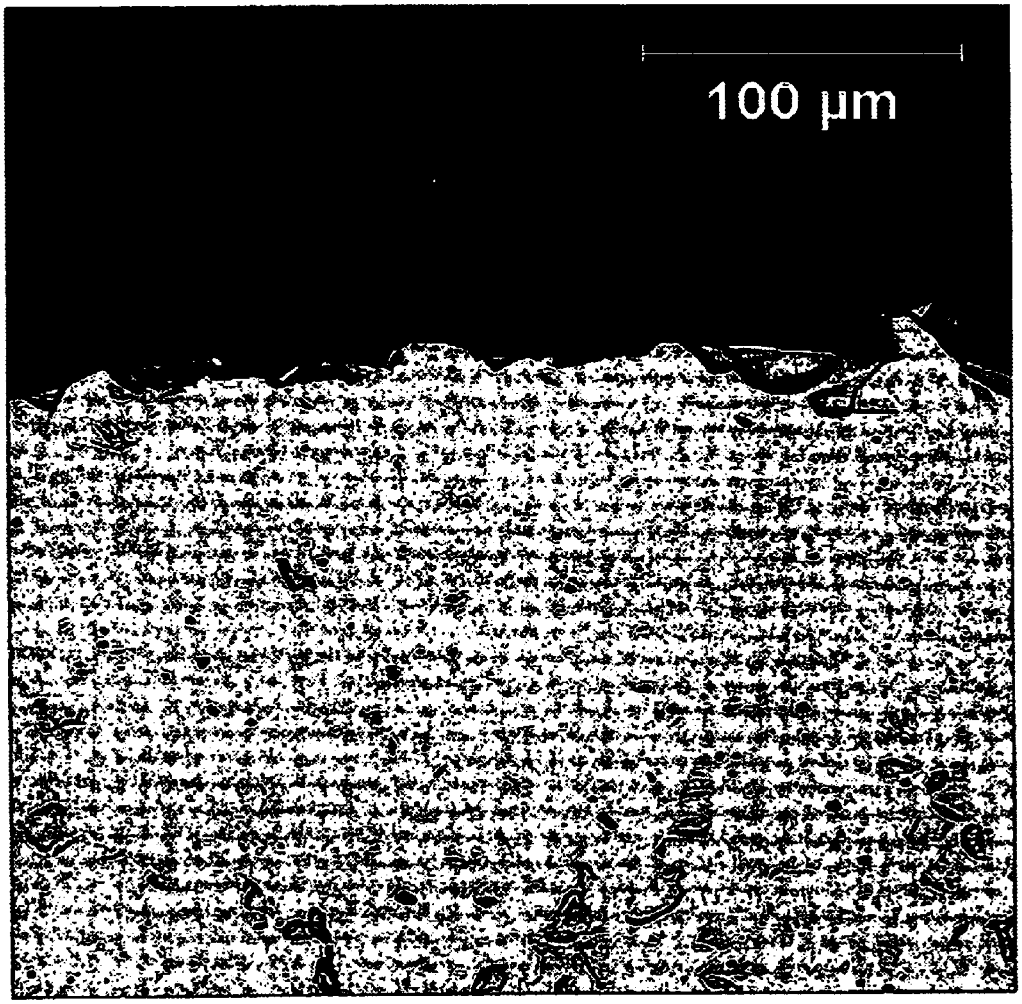
FIGS. 4*a*–4*b* are micrographs of ceramic inert anodes comprising a single-phase oxide of nickel and iron.
Figure 4B:
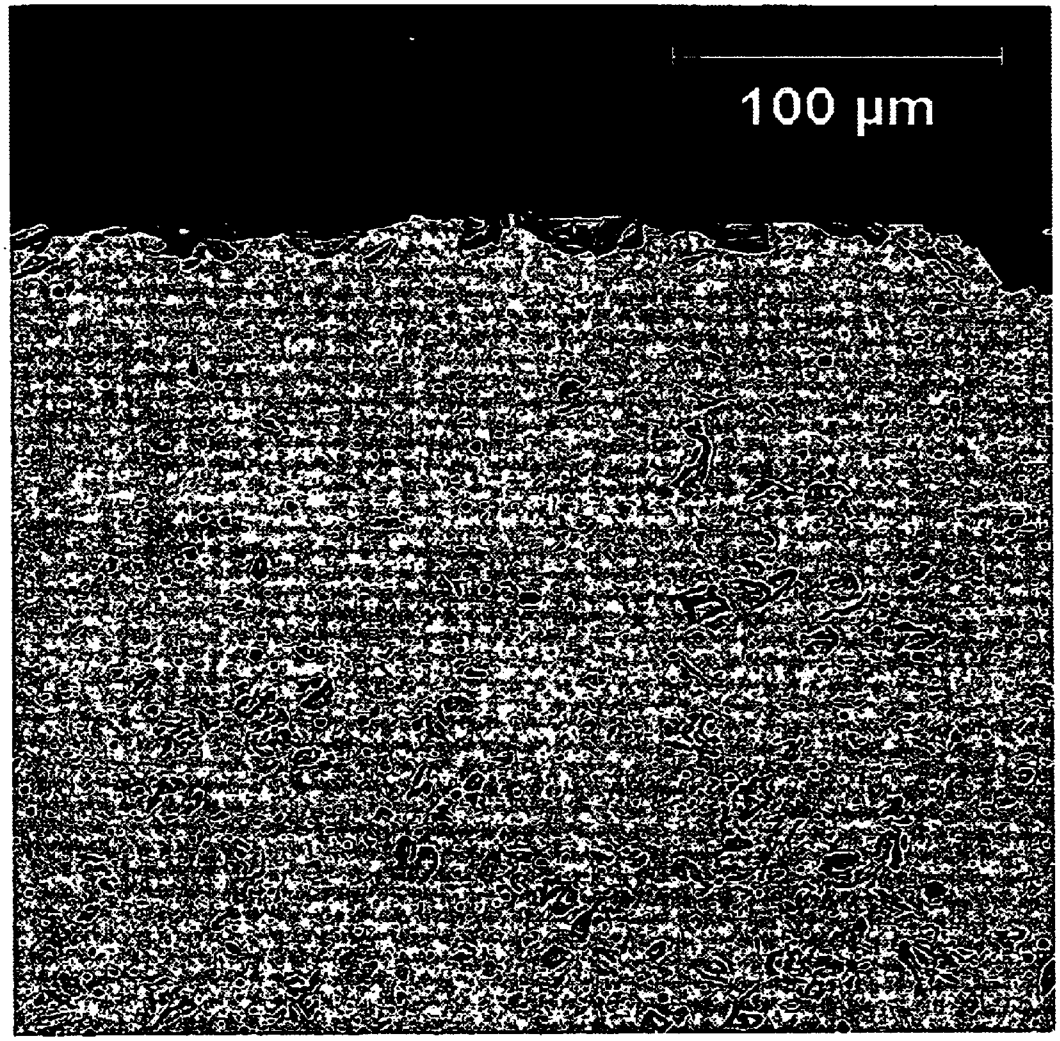

*Sintered in nitrogen
**Spinel and hematite
***Spinel and slight trace of Ni-rich monoxide
****Spinel and Ni-rich monoxide FIGS. 4*a*–4*b* are micrographs of ceramic inert anodes corresponding to Sample Nos. 4 and 6 listed in Table 1, having Ni/(Ni+Fe) mole ratios of 0.296 and 0.308, respectively. After sintering in air at 1,500° C., the samples were held in air for 100 hours at 1,000° C. Each sample comprises a single-phase spinel of nickel and iron in accordance the present invention.

Figure 5A:
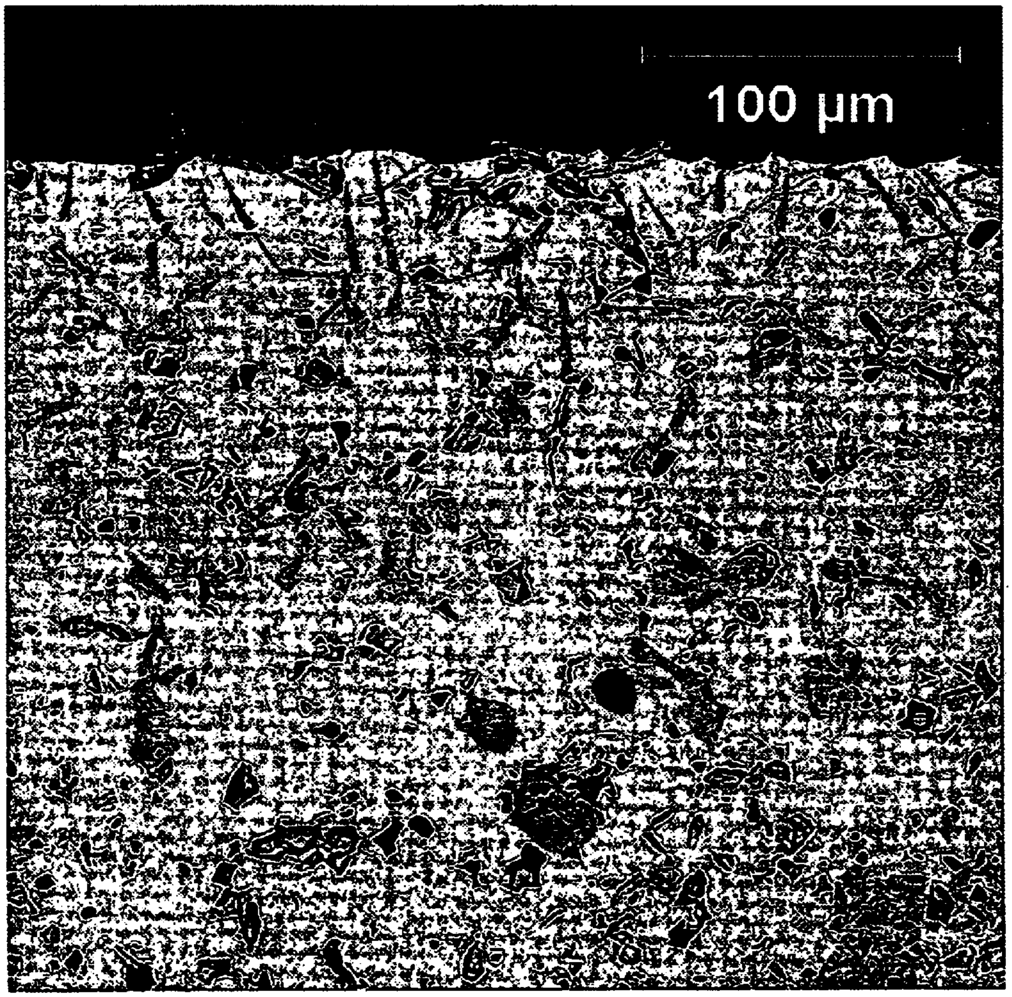
FIGS. 5*a*–*d* are micrographs of multiple-phase ceramic inert anodes.
Figure 5B:
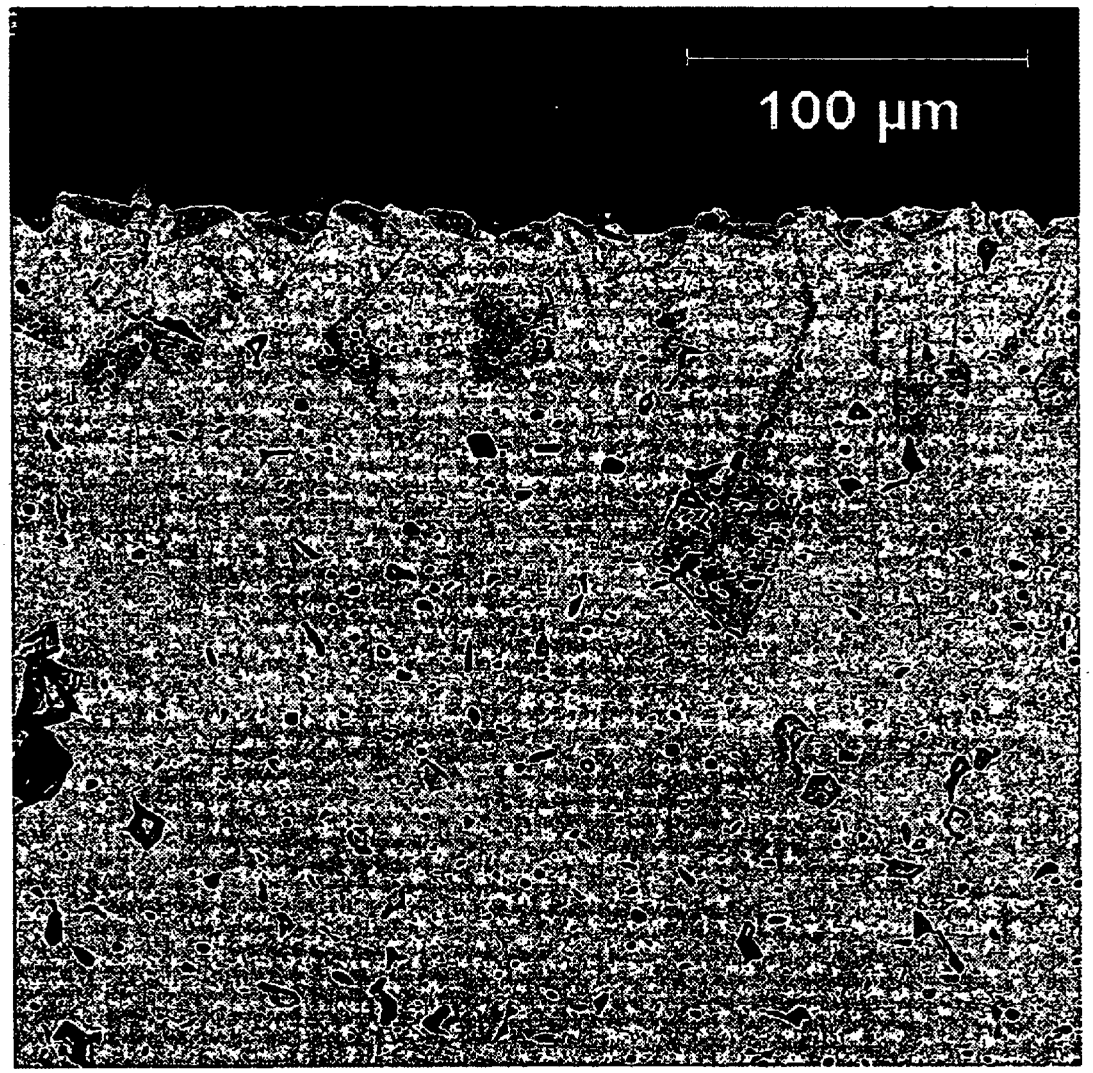
Figure 5C:
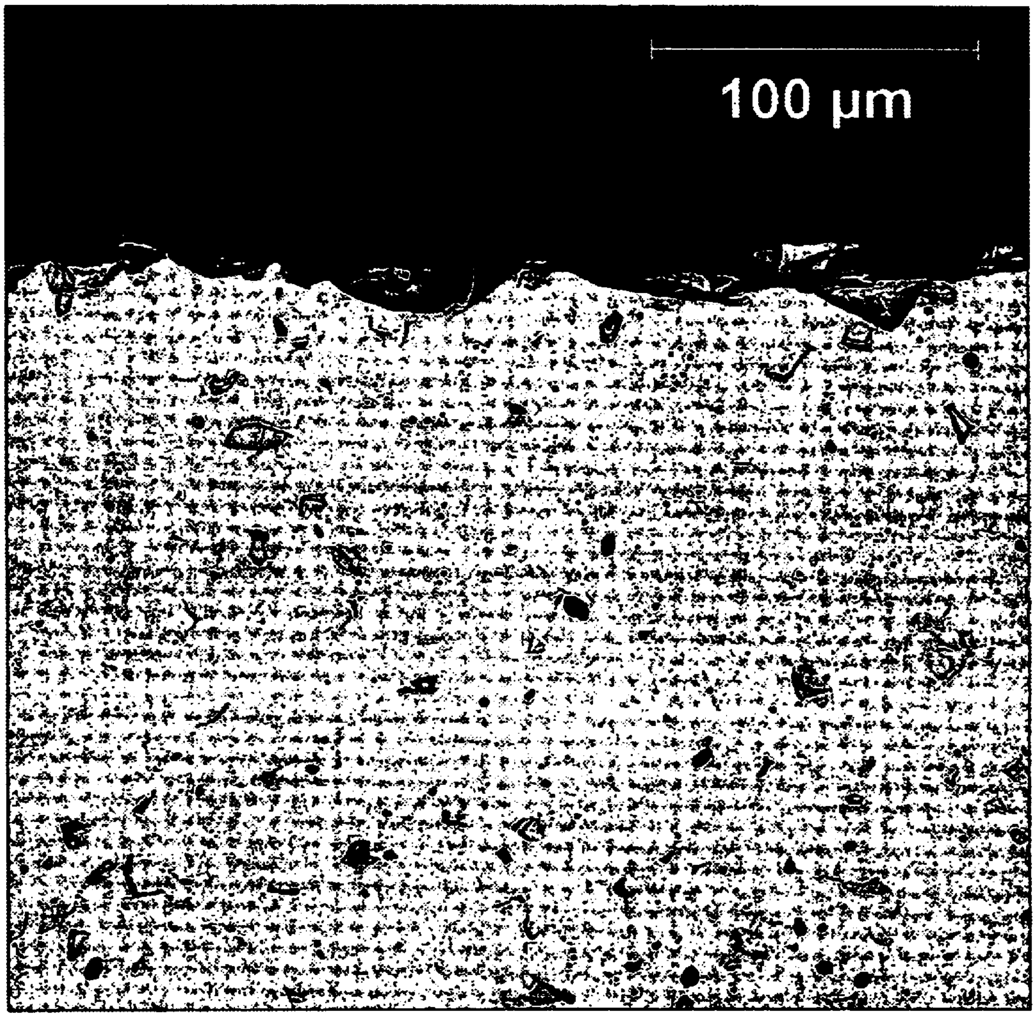
Figure 5D:
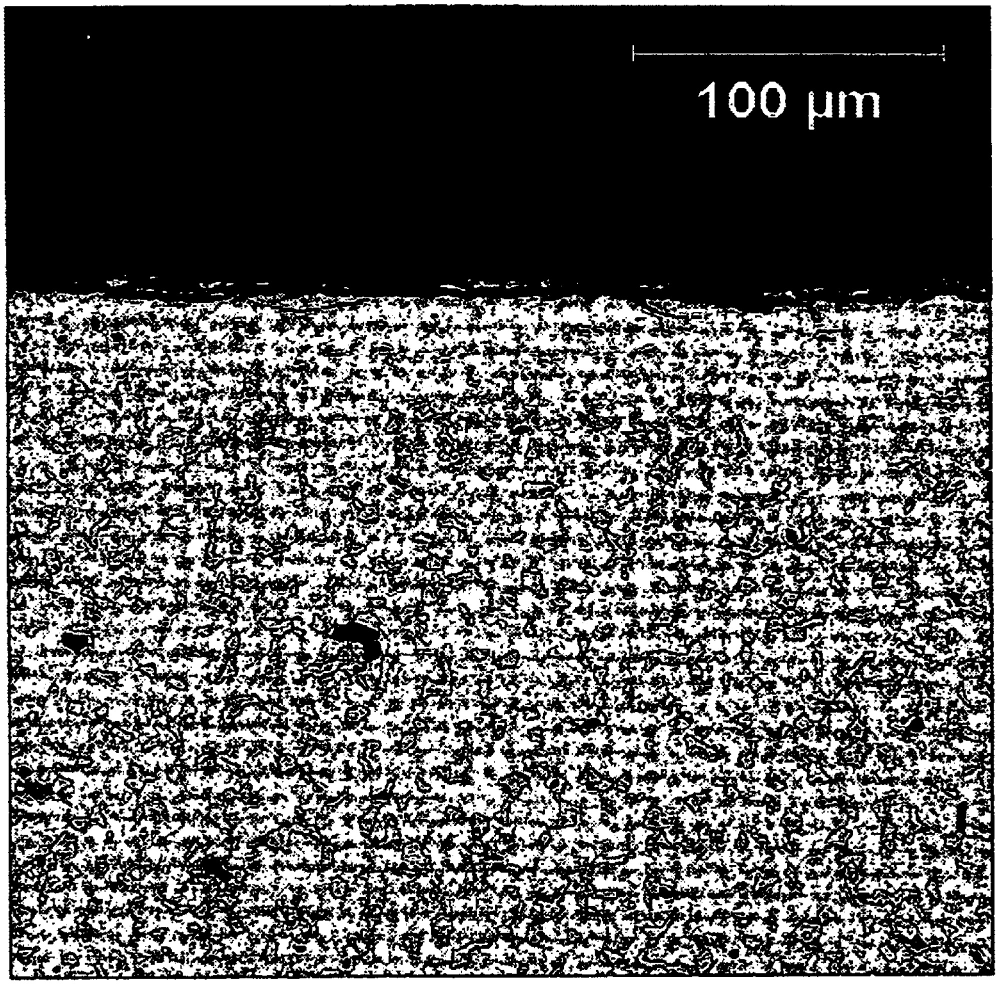

FIGS. 5*a*–*d* are micrographs of multiple-phase ceramic inert anodes corresponding to Sample Nos. 2, 3, 7 and 8 listed in Table 1. After sintering in air at 1,500° C., the samples were held in air for 100 hours at 1,000° C. In FIGS. 5*a* and 5*b*, the Ni/(Ni+Fe) mole ratios are 0.258 and 0.280, respectively, and the materials comprise spinel phases and hematite phases. The darker regions correspond to the hematite phase, which tends to form near the external surface of each sample. In FIG. 5*c*, the Ni/(Ni+Fe) mole ratio is 0.325, and the material comprises a spinel phase with only a trace amount of Ni-rich monoxide. In FIG. 5*d*, the Ni/(Ni+Fe) mole ratio is 0.350, and the material comprises a spinel phase and a substantial amount of a Ni-rich monoxide phase. The lighter regions correspond to the Ni-rich monoxide phase.

Figure 6A:
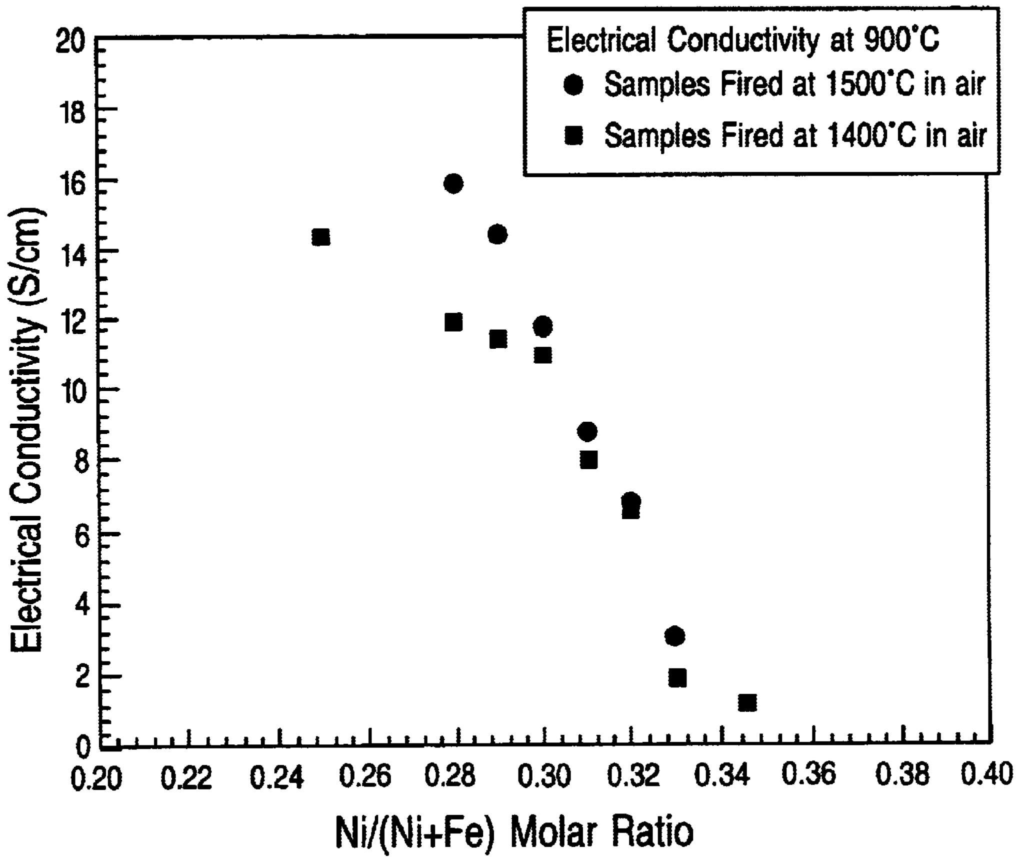
FIG. 6 is a graph of initial anode electrical conductivity versus Ni(Ni+Fe) mole ratio for various anode compositions.
Figure 6B:
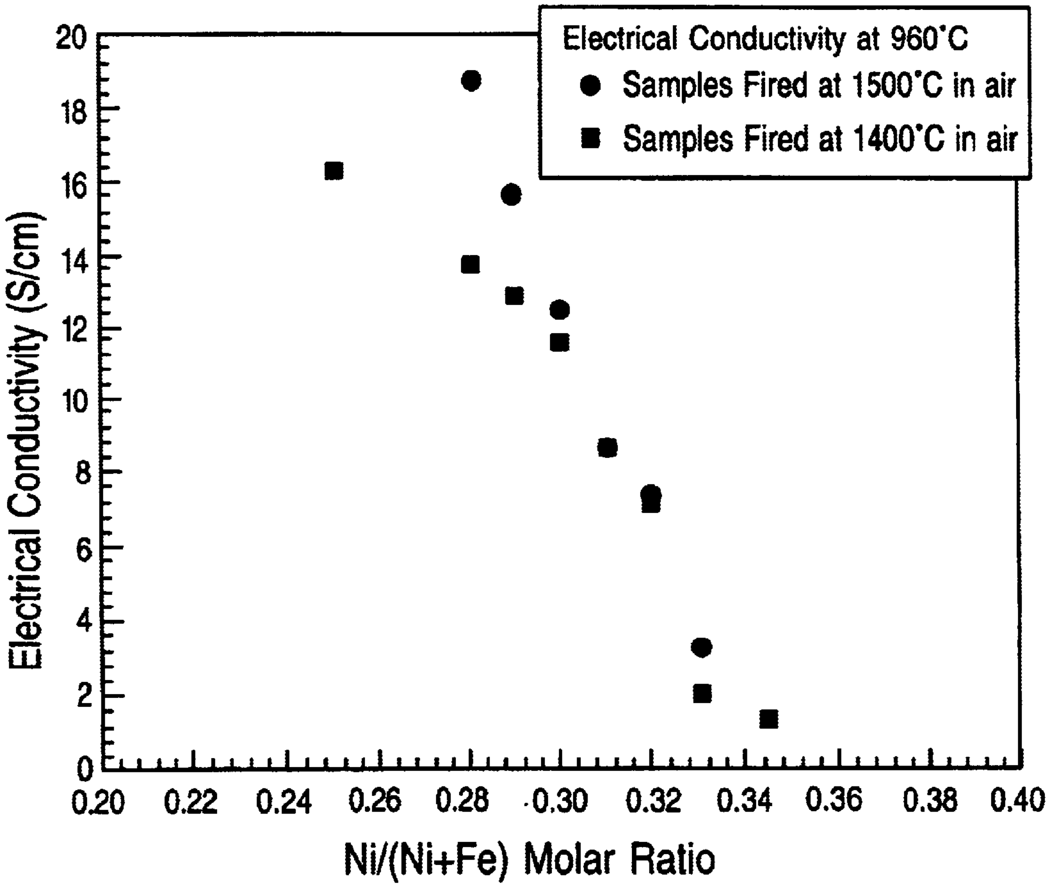
Figure 6C:
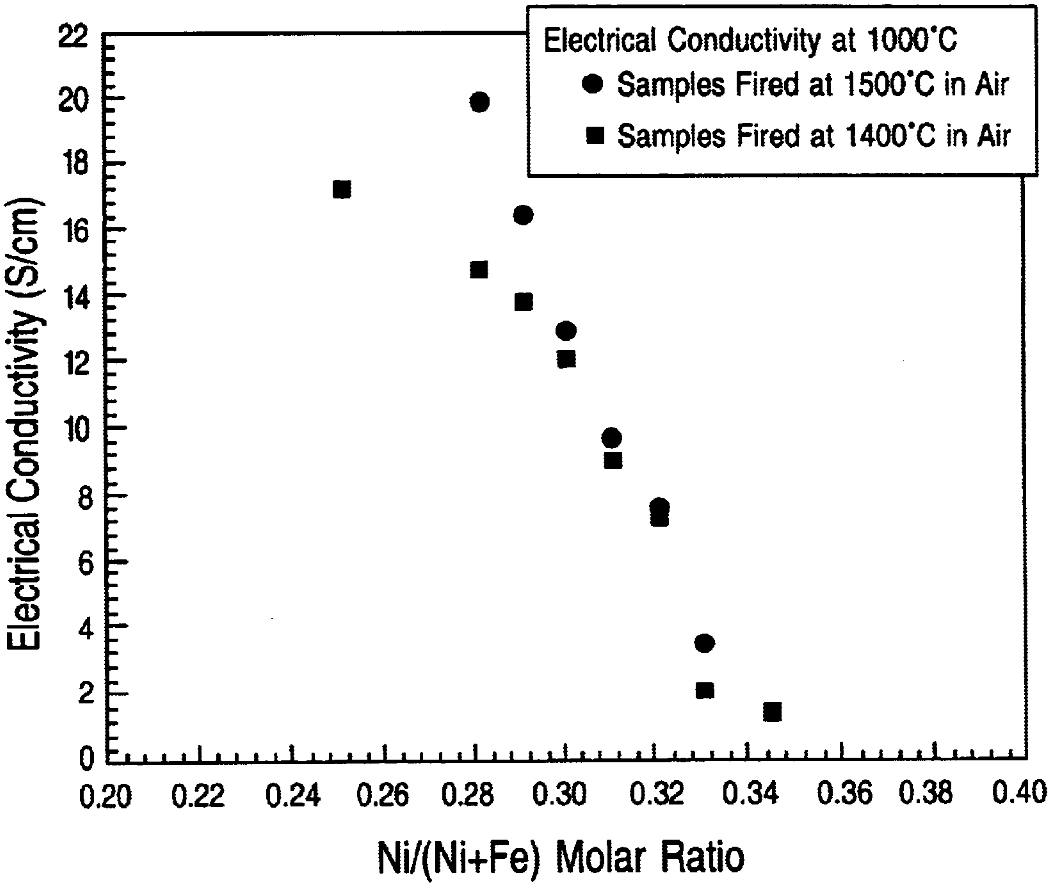

FIGS. 6*a*–6*c* are graphs illustrating initial electrical conductivity of the samples shown in Table 1. Electrical conductivity was measured by a four-probe DC technique in argon as a function of temperature ranging from room temperature to 1,000° C. At each temperature, the voltage and current was measured, and the electrical conductivity was obtained by Ohm's law. As shown in FIGS. 6*a*–6*c*, at temperatures of from 900 to 1,000° C., typical of operating aluminum production cells, the electrical conductivity of the ceramic inert anode materials having Ni/(Ni+Fe) mole ratios between 0.300 and 0.330 are greater than about 5 S/cm, and may reach 10 S/cm or higher at such temperatures. In addition to high initial electrical conductivity, the ceramic inert anodes exhibit good stability characteristics, as demonstrated by relatively stable cell voltage for over one week.

The samples lited in Table 1 were evaluated in a Hall test cell similar to that schematically illustrated in FIG. 1. The cell was operated for 90 hours at 960° C. with an aluminum fluoride to sodium fluoride bath ratio of 1.1. The alumina concentration was maintained near saturation at about 7–7.5 weight percent. The solubilities of the Ni—Fe—O anode compositions of the invention were tested by holding approximately 7 g of oxide pellets which had been air-sintered at 1,500° C. in 160 g of a standard cryolitic molten salt bath at 960° C. for 24 hours. The standard salt bath was contained in a platinum crucible and prepared by batching Hall cell bath and $Al_2O_3$ so that NaF:$AlF_3$=1.2, $Al_2O_3$=6.4 weight percent, and $CaF_2$=6.2 weight percent. Dried air was circulated over the salt bath at a low flow rate of 100 $cm^3$/min, as well as periodically bubbled into the molten salt to maintain oxidizing conditions. Samples of the melt were withdrawn periodically for chemical analysis. When the foregoing solubility test method is used, the weight percentage of total dissolved Fe and Ni oxides is preferably below 0.075 weight percent, more preferably below 0.06 weight percent. The amount of total dissolved oxides, i.e., Fe and Ni, as measured by the foregoing procedure, is defined herein as the "Hall cell bath solubility".

The Na/F resistance listed in Table 1 corresponds to the depth of Na/F penetration measured from the surface of samples positioned above the molten salt during the salt solubility test. A low penetration depth is preferred because it indicates resistance to salt fume attack.

Figure 7:
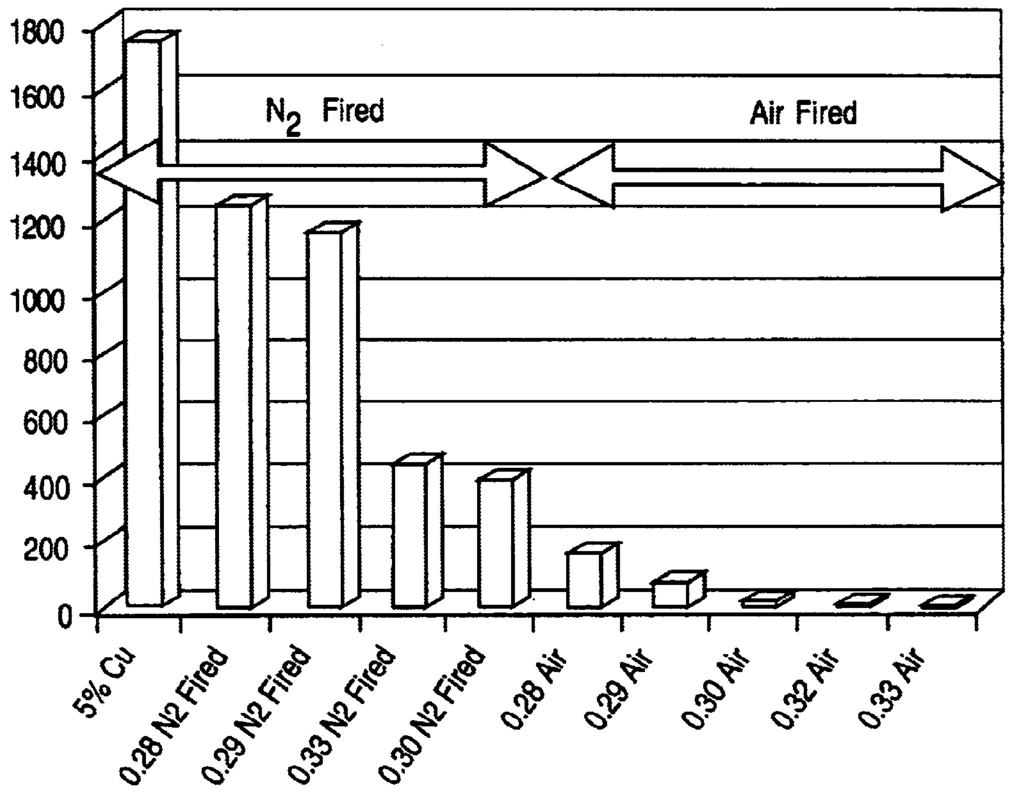
FIG. 7 illustrates reaction zone test results for inert anode materials having varying Ni/(Ni+Fe) moler ratios fired in nitrogen and fired in air.
Figure 8A:
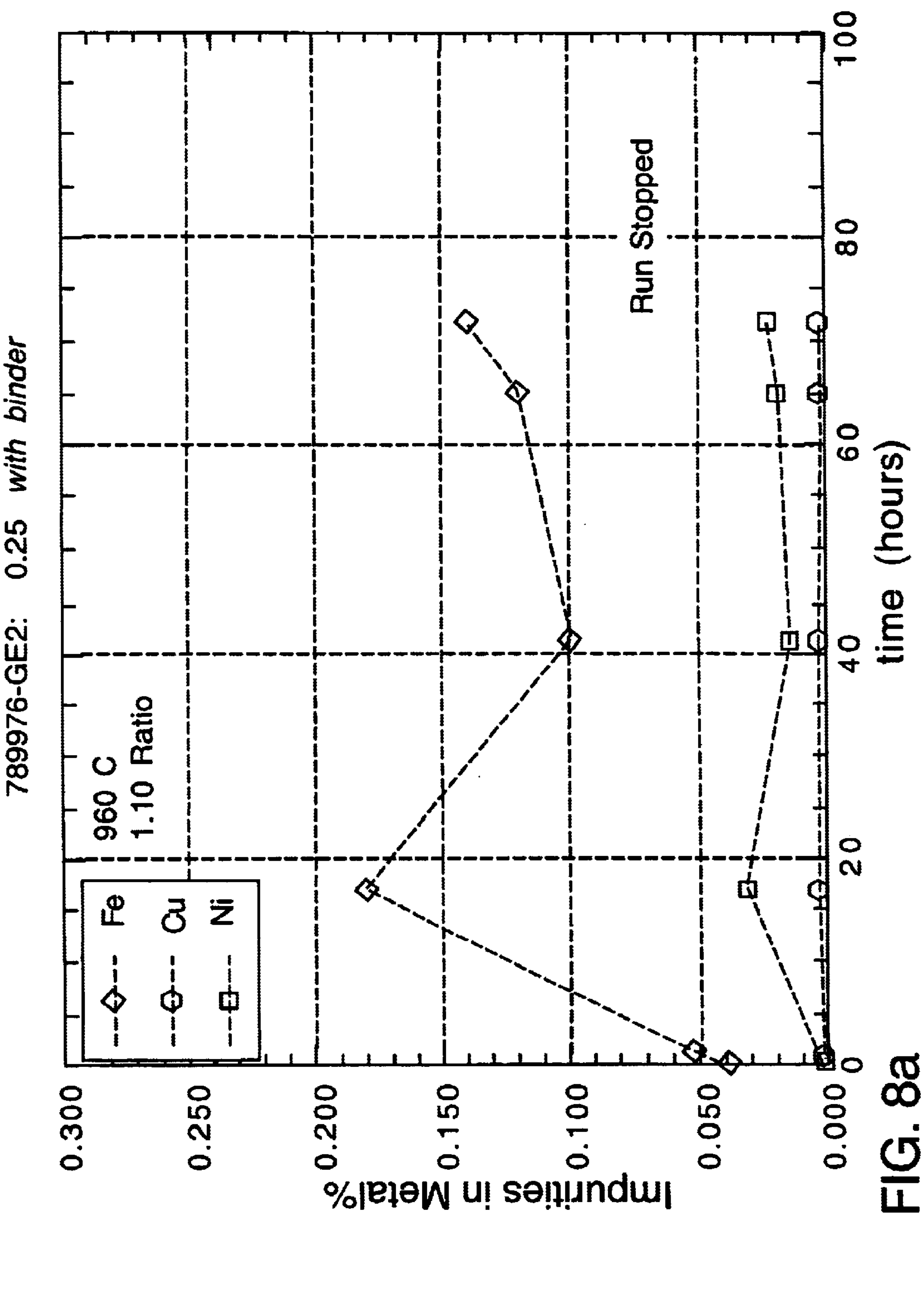
FIGS. 8*a*–8*e* illustrate aluminum impurity levels from aluminum production test cells operated with inert anode materials having varying Ni/(Ni+Fe) mole ratios.
Figure 8B:
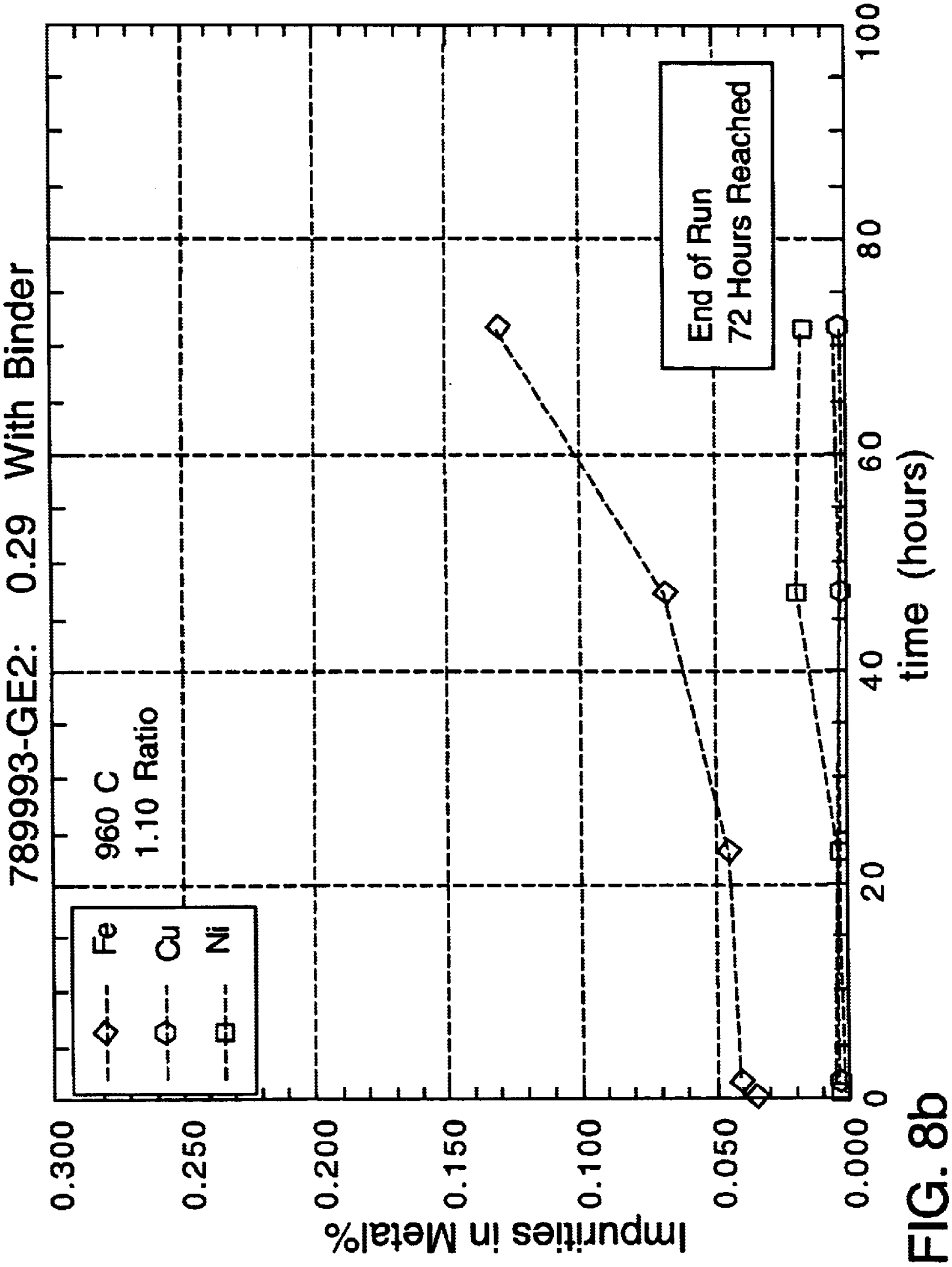
Figure 8C:
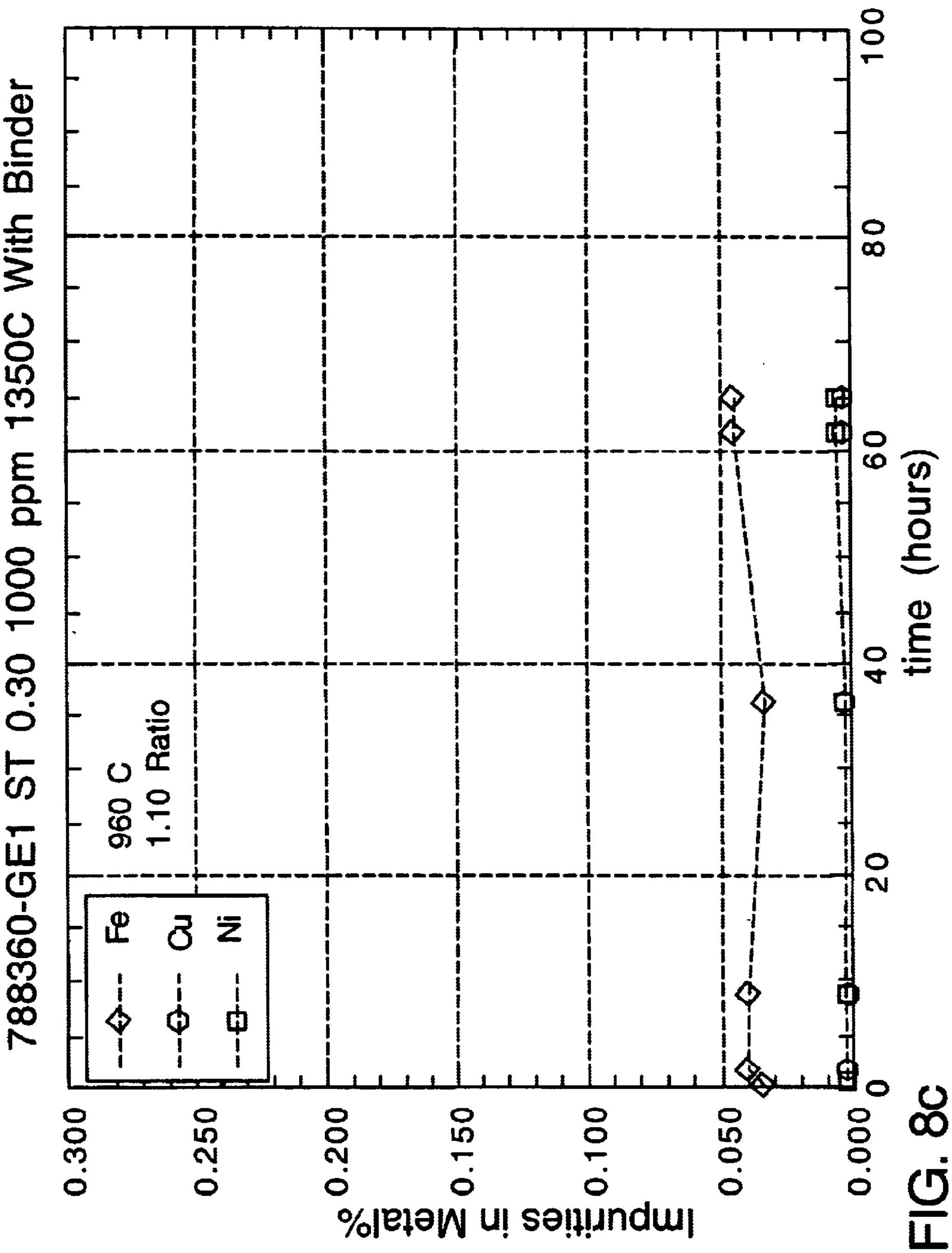
Figure 8D:
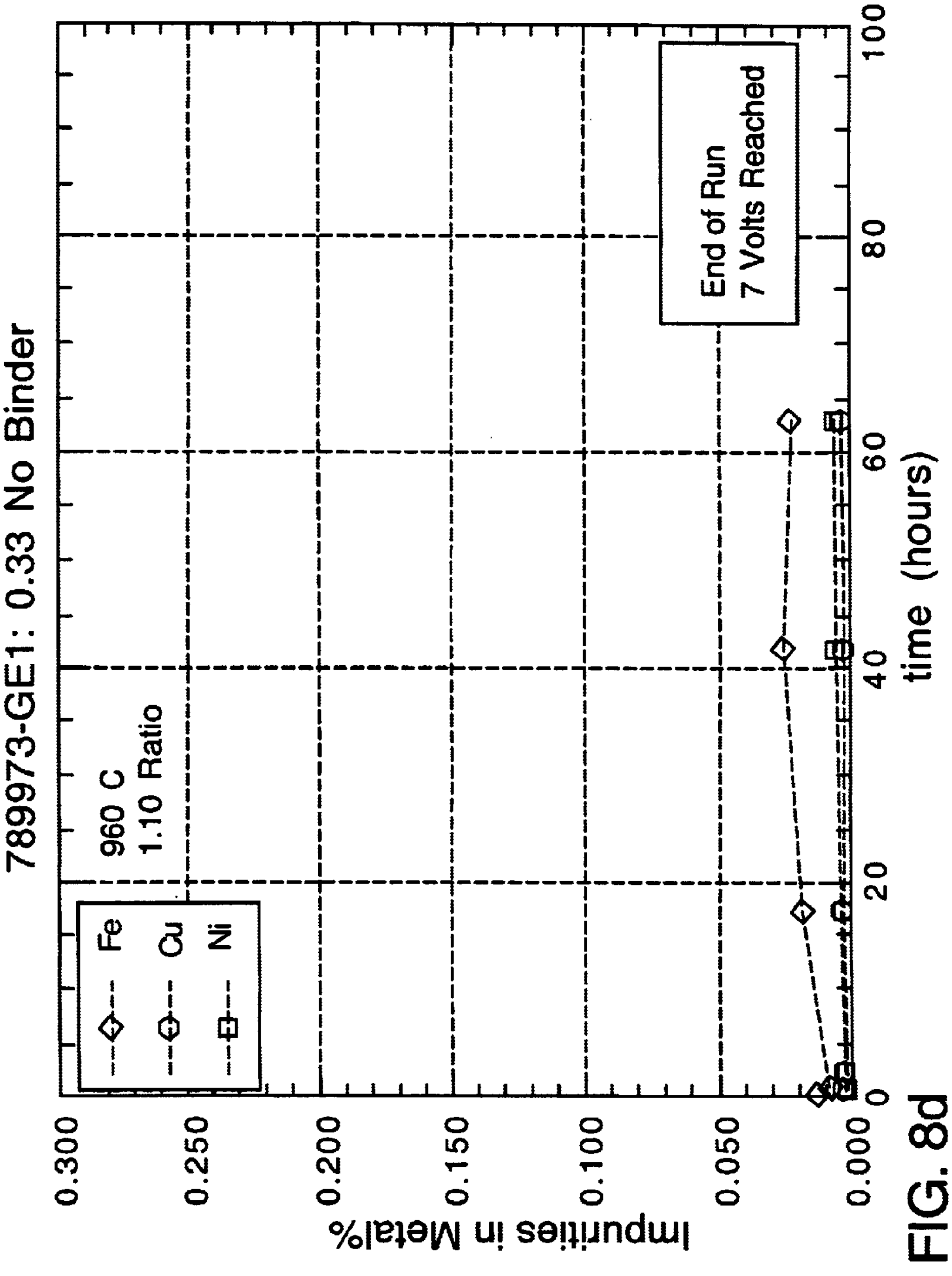
Figure 8E:
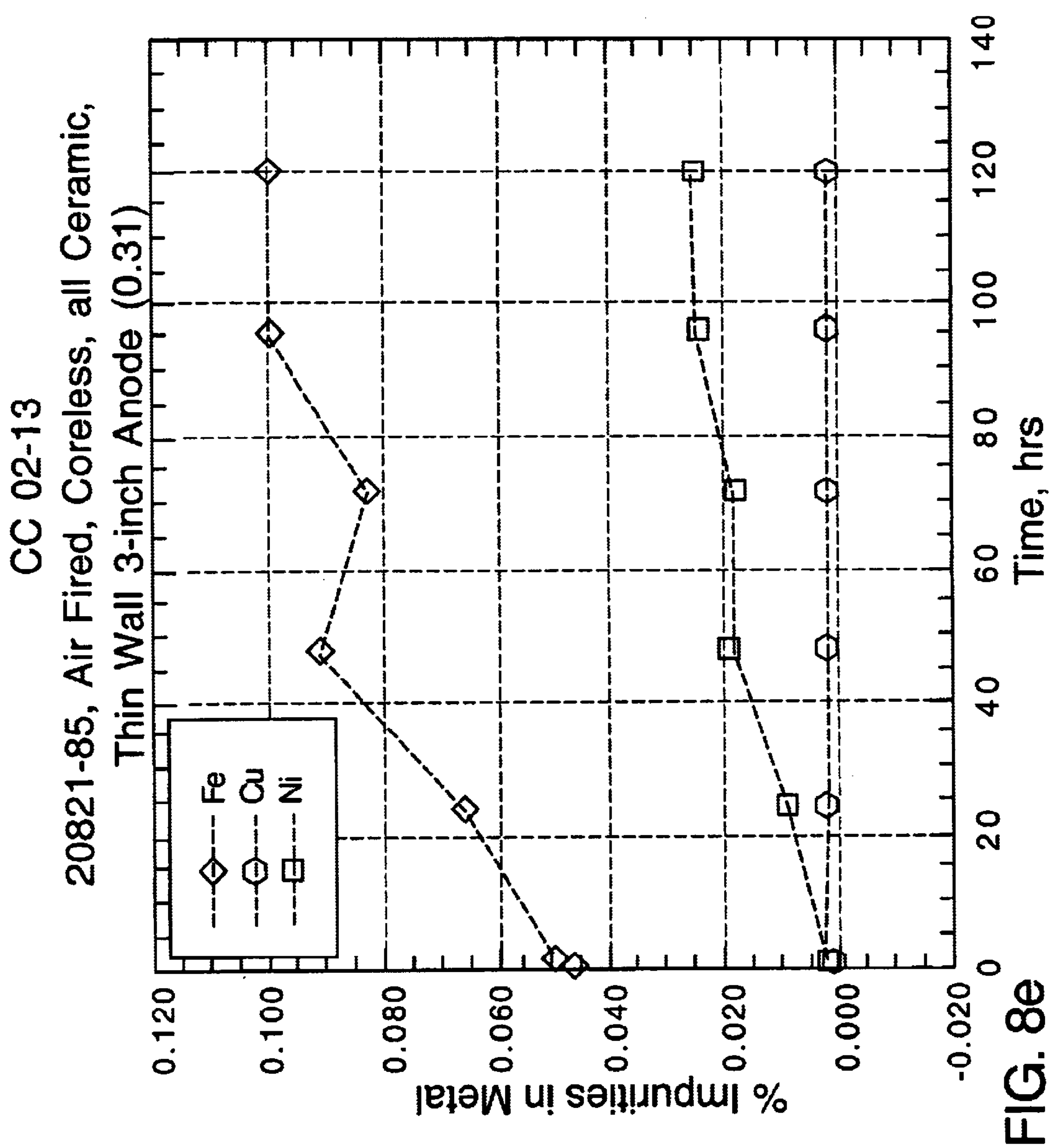

FIG. 7 illustrates reaction zone test results for inert anode materials having varying Ni(Ni+Fe) mole ratios. The anodes were fired under nitrogen or air atmospheres.

Table 2 lists initial electrical conductivity values at temperatures of 900, 960 and 1,000° C. for samples having varying Ni/(Ni+Fe) mole ratios. The samples were sintered in air at either 1,400° C. or 1,500° C. As shown in Table 2, the electrical conductivities are substantially decreased at Ni(Ni+Fe) mole ratios above 0.33.

TABLE 2

Electrical Conductivity (S/cm) vs. Ni/(Ni+Fe) Mole Ratio

| | | Ni/(Ni+Fe) Mole Ratio | | | | | | | |
|---|---|---|---|---|---|---|---|---|---|
| Firing condition | T (° C.) | 0.25 | 0.28 | 0.29 | 0.3 | 0.31 | 0.32 | 0.33 | 0.345* |
| 1,400° C. | 1,000 | 17.24 | 14.84 | 13.84 | 12.12 | 9.12 | 7.41 | 2.10 | 1.43 |
| air | 960 | 16.41 | 13.80 | 12.84 | 11.63 | 8.67 | 7.07 | 1.97 | 1.29 |
| | 900 | 14.35 | 11.82 | 11.39 | 10.92 | 8.02 | 6.59 | 1.80 | 1.13 |
| 1,500° C. | 1,000 | | 19.90 | 16.47 | 12.97 | 9.73 | 7.63 | 3.49 | |
| air | 960 | | 18.87 | 15.71 | 12.47 | 9.34 | 7.30 | 3.27 | |
| | 900 | | 15.84 | 14.43 | 11.68 | 8.76 | 6.76 | 3.00 | |

*Containing 2 wt % ZnO

The impurity concentrations in aluminum produced by test cells described above are graphically shown in FIGS. 8*a*–8*e*. The results illustrated in FIGS. 8*a*–8*e* show low levels of aluminum contamination by the ceramic inert anode. In addition, the inert anode wear rate was extremely low. Optimization of processing parameters and cell operation may further improve the purity of aluminum produced in accordance with the invention.

The present ceramic inert anodes are particularly useful in electrolytic cells for aluminum production operated at temperatures in the range of about 800–1,000° C. A particularly preferred cell operates at a temperature of about 900–980° C., preferably about 930–970° C. An electric current is passed between the inert anode and a cathode through a molten salt bath comprising an electrolyte and an oxide of the metal to be collected. In a preferred cell for aluminum production, the electrolyte comprises aluminum fluoride and sodium fluoride and the metal oxide is alumina. The weight ratio of sodium fluoride to aluminum fluoride is about 0.7 to 1.25, preferably about 1.0 to 1.20. The electrolyte may also contain calcium fluoride, lithium fluoride and/or magnesium fluoride.

Having described the presently preferred embodiments, it is to be understood that the invention may be otherwise embodied within the scope of the appended claims.

What is claimed is:

1. An inert anode for use in an electrolytic aluminum production cell, the inert anode comprising a ceramic material consisting essentially of a binary complex oxide of nickel and iron, wherein the oxide of nickel and iron has a Ni/(Ni+Fe) mole ratio of from 0.290 to 0.330, and the ceramic material is a single-phase at an operation temperature of the electrolytic aluminum production cell with a Hall Cell bath solubility as a percentage of total dissolved oxides of Ni and Fe is about 0.075 wt % or less.

2. The inert anode of claim 1, wherein the Ni/(Ni+Fe) mole ratio is from 0.310 to 0.320.

3. The inert anode of claim 1, wherein the operation temperature of the cell is from 900° C. to 1,000° C.

4. The inert anode of claim 1, wherein the ceramic material is also said single-phase at a sintering temperature of the ceramic material.

5. The inert anode of claim 4, wherein the sintering temperature is from about 1,200 to about 1,650° C.

6. The inert anode of claim 4, wherein the ceramic material is sintered in air.

7. The inert anode of claim 1, wherein the ceramic material is also said single-phase at room temperature.

8. The inert anode of claim 1, wherein the ceramic material has an electrical conductivity of at least 5 S/cm at a temperature of about 1,000° C.

9. The inert anode of claim 1, wherein the ceramic material has an electrical conductivity of at least 10 S/cm at a temperature of about 1,000° C.

10. An electrolytic aluminum production cell comprising:

a molten salt bath comprising an electrolyte and aluminum oxide;

a cathode; and an inert anode comprising a ceramic material consisting essentially of a binary complex oxide of nickel and iron, wherein the oxide of nickel and iron has a Ni/(Ni+Fe) mole ratio of from 0.290 to 0.330, and the ceramic material is a single-phase at an operation temperature of the electrolytic aluminum production cell with a Hall Cell bath solubility as a percentage of total dissolved oxides of Ni and Fe is about 0.075 wt % or less.

11. The electrolytic aluminum production cell of claim 10, wherein the Ni/(Ni+Fe) mole ratio is from 0.310 to 0.320.

12. The electrolytic aluminum production cell of claim 10, wherein the operation temperature of the cell is 900° C. to 1,000° C.

13. The electrolytic aluminum production cell of claim 10, wherein the ceramic material has an electrical conductivity of at least 5 S/cm at a temperature of about 1,000° C.

14. The electrolytic aluminum production cell of claim 10, wherein the ceramic material has an electrical conductivity of at least 10 S/cm at a temperature of about 1,000° C.

15. A method of making an inert anode, comprising:

mixing nickel oxide and iron oxide in a Ni/(Ni+Fe) mole ratio of from 0.290 to 0.330; and consolidating the mixture to form a ceramic material consisting essentially of a binary complex oxide of nickel and iron having said Ni/(Ni+Fe) mole ratio, wherein the ceramic material is single-phase at an operation temperature of the electrolytic aluminum production cell with a Hall Cell bath solubility as a percentage of total dissolved oxides of Ni and Fe is about 0.075 wt % or less.

16. The method of claim 15, wherein the consolidating step comprises pressing and sintering the mixture.

17. The method of claim 16, wherein the mixture is sintered at a temperature of from about 1,300 to about 1,650° C.

18. The method of claim 16, wherein the mixture is sintered in an oxygen-containing atmosphere.

19. The method of claim 16, wherein the mixture is sintered in air.

20. The method of claim 15, wherein the iron oxide is provided from powders of $Fe_2O_3$ and $Fe_3O_4$.

21. A method of producing commercial purity aluminum comprising:

passing current between an inert anode and a cathode through a bath comprising an electrolyte and aluminum oxide, wherein the inert anode comprises a ceramic material consisting essentially of a binary complex oxide of nickel and iron, the ceramic material has a Ni/(Ni+Fe) mole ratio of from 0.290 to 0.330, and the ceramic material is a single-phase during the aluminum production process; and recovering aluminum comprising a maximum of 0.2 weight percent Fe.

22. The method of claim 21, wherein the ceramic inert anode has an initial electrical conductivity of at least about 5 S/cm at a temperature of 1,000° C.

23. The method of claim 21, wherein the recovered aluminum comprises less than 0.18 weight percent Fe.

24. The method of claim 21, wherein the recovered aluminum comprises a maximum of 0.034 weight percent Ni.

25. The method of claim 21, wherein the recovered aluminum comprises a maximum of 0.1 weight percent Cu.

26. The method of claim 25, wherein the recovered aluminum comprises less than 0.15 weight percent Fe, 0.034 weight percent Cu, and 0.030 weight percent Ni.

27. The method of claim 25, wherein the recovered aluminum comprises a maximum of 0.13 weight percent Fe, 0.03 weight percent Cu, and 0.030 weight percent Ni.

28. The method of claim 21, wherein the recovered aluminum further comprises a maximum of 0.2 weight percent Si, 0.03 weight percent Zn, and 0.03 weight percent Co.

* * * * *